(12) United States Patent
Hong et al.

(10) Patent No.: US 11,472,037 B2
(45) Date of Patent: Oct. 18, 2022

(54) ROBOT FOR ASSISTING A USER IN HEARING

(71) Applicant: LG ELECTRONICS INC., Seoul (KR)

(72) Inventors: Kichu Hong, Seoul (KR); Miyoung Seo, Seoul (KR); Hongkyu Park, Seoul (KR); Aram Kim, Seoul (KR); Yeonkyung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 455 days.

(21) Appl. No.: 16/499,024

(22) PCT Filed: Feb. 22, 2019

(86) PCT No.: PCT/KR2019/002246
§ 371 (c)(1),
(2) Date: Sep. 27, 2019

(87) PCT Pub. No.: WO2020/171268
PCT Pub. Date: Aug. 27, 2020

(65) Prior Publication Data
US 2021/0331324 A1 Oct. 28, 2021

(51) Int. Cl.
*H04R 25/00* (2006.01)
*B25J 11/00* (2006.01)
(Continued)

(52) U.S. Cl.
CPC ......... *B25J 11/0005* (2013.01); *B25J 9/1679* (2013.01); *B25J 13/003* (2013.01);
(Continued)

(58) Field of Classification Search
CPC .... H04R 25/353; H04R 25/356; H04R 25/48; H04R 25/554
(Continued)

(56) References Cited

U.S. PATENT DOCUMENTS

2004/0104702 A1   6/2004  Nakadai et al.
2005/0078838 A1*  4/2005  Simon .................... H03G 5/025
                                                               381/98
(Continued)

FOREIGN PATENT DOCUMENTS

JP    2004-20817 A    1/2004
JP    2018-20000 A    2/2018
(Continued)

*Primary Examiner* — Katherine A Faley
(74) *Attorney, Agent, or Firm* — Birch, Stewart, Kolasch & Birch, LLP (57) ABSTRACT

Provided a robot for assisting hearing of a user, while minimizing an influence on the surroundings. The robot includes a speaker, a microphone configured to recognize a voice, a processor configured to acquire a position of a user's face when a hearing aid command is acquired on the basis of the voice recognized through the microphone, and a driving unit configured to cause the speaker to be moved toward the position of the user's face, wherein the processor acquires a sound which is a target of hearing aid, generates an assistant sound by amplifying a predetermined frequency band of the sound or converting the predetermined frequency band of the sound into a different frequency band, and outputs the assistant sound through the speaker.

16 Claims, 10 Drawing Sheets

(51) Int. Cl.
  *B25J 9/16*         (2006.01)
  *B25J 13/00*        (2006.01)
(52) U.S. Cl.
  CPC ......... *H04R 25/353* (2013.01); *H04R 25/356* (2013.01); *H04R 25/48* (2013.01); *H04R 25/554* (2013.01)
(58) Field of Classification Search
  USPC ........................................................ 381/312
  See application file for complete search history.

(56) References Cited

U.S. PATENT DOCUMENTS

| | | | |
|---|---|---|---|
| 2010/0329491 A1* | 12/2010 | Johansen | H04R 25/558 |
| | | | 381/315 |
| 2012/0300964 A1 | 11/2012 | Ku et al. | |
| 2017/0330571 A1* | 11/2017 | Komaki | G10L 21/00 |
| 2018/0253281 A1* | 9/2018 | Jarvis | G06F 3/167 |
| 2019/0022850 A1* | 1/2019 | Luo | B25J 5/007 |

FOREIGN PATENT DOCUMENTS

| | | |
|---|---|---|
| KR | 10-2012-0131778 A | 12/2012 |
| KR | 10-2019-0006331 A | 1/2019 |

* cited by examiner

ROBOT FOR ASSISTING A USER IN HEARING

CROSS REFERENCE TO RELATED APPLICATIONS

This application is the National Phase of PCT International Application No. PCT/KR2019/002246, filed on Feb. 22, 2019, which is hereby expressly incorporated by reference into the present application.

TECHNICAL FIELD

The present invention relates to a robot, and more particularly, to a robot for assisting a user in hearing.

BACKGROUND ART

Recently, the number of people who suffer from hearing impairment is on the increase. Hearing impairment, which refers to a condition in which hearing is deteriorated or lost, may be caused by various reasons. For example, hearing impairment may occur as hearing regresses due to aging or may occur as hearing is damaged due to frequent use of earphones.

Meanwhile, in the case of hearing impairment, there may be individual differences, and each person may suffer from hearing impairment at different frequency bands and sound pressures may be different. For example, some people in their 80's may not be able to hear sound in a frequency band of 5k [Hz] or higher, and some people in their 50's may not be able to hear sound in a frequency band of 8k [Hz] or higher. As another example, some people in the same thirties may hear if a sound in a frequency band of 7k [Hz] is 30 dB or more, while others may hear only if the sound in the frequency band of 7k [Hz] is 60 dB or more.

Hearing aids, speakers, etc., have been used as a mechanism to help people with hearing impairment easily hear. As a related art, Japanese Patent Registration No. 6014070 discloses a method of outputting a voice signal by adjusting a frequency according to hearing characteristics of a listener. In this case, however, the voice signal is not only transmitted to the listener but also spreads to other people, thereby disturbing those around the listener, and since the frequency is adjusted according to determined reference frequency characteristics, there are limitations in providing hearing aids tailored to characteristics of each listener.

DISCLOSURE

Technical Problem

An aspect of the present invention is directed to providing a robot which assists a specific user in hearing, while minimizing an impact on the surroundings.

Another aspect of the present invention is directed to providing a robot which provides a user with a customized hearing aid function according to hearing characteristics of each user.

Technical Solution

To achieve these and other advantages and in accordance with the purpose of the invention, as embodied and broadly described herein, there is provided a robot including: a speaker; a microphone configured to recognize a voice; a processor configured to acquire a position of a user's face when a hearing aid command is acquired on the basis of the voice recognized through the microphone; and a driving unit configured to cause the speaker to be moved toward the position of the user's face, wherein the processor acquires a sound which is a target of hearing aid, generates an assistant sound by amplifying a predetermined frequency band of the sound or converting the predetermined frequency band of the sound into a different frequency band, and outputs the assistant sound through the speaker.

The processor may acquire, as a sound which is the target for hearing aid, a surrounding sound excluding a voice of the user, among surrounding sounds recognized through the microphone.

The robot may further include a communication unit configured to transmit and receive a signal to and from a display device, wherein the processor may receive a sound source being output by the display device from the display device and acquire the sound source as the sound which is the target for hearing aid.

The robot may further include a memory configured to store data mapped to a hearing abnormal frequency band requiring hearing aid for each user, wherein the processor recognizes a user corresponding to the hearing aid command, acquires a hearing abnormal frequency band mapped to the recognized user from the memory, and sets the hearing abnormal frequency band as a frequency band amplified or converted when the assistant sound is generated.

The processor may output a test sound, acquire the hearing abnormal frequency band as an input in response to the test sound is received, and set the hearing abnormal frequency band as a frequency band amplified or converted when the assistant sound is generated.

The processor may further acquire a required sound volume through the input in response to the test sound, and generate the assistant sound by amplifying the hearing abnormal frequency band of the sound by the required sound volume.

The processor may divide an audio frequency band into a plurality of partial frequency bands, sequentially outputs the partial frequency bands when the test sound is output, and set, as the hearing abnormal frequency band, a partial frequency band in which the input is not received.

The robot may further include a camera, wherein the processor may recognize the user corresponding to the hearing aid command through the voice recognized through the microphone and a face captured through the camera.

The driving unit may include at least one of a moving unit configured to move in a direction toward the user, a rotating unit configured to adjust an output direction of the speaker, and a tilting unit configured to adjust an output angle of the speaker.

The processor may output the assistant sound, while moving along the user corresponding to the hearing aid command.

Advantageous Effects

According to an embodiment of the present invention, by outputting an assistant sound to a position of the user's face who needs a hearing aid, it is possible to assist a user in hearing, while minimizing an impact on other people.

Further, by excluding a user's voice when generating an assistant sound, it is possible to acquire only a sound that requires hearing aid, thereby minimizing the occurrence of a confusion due to a case where the user's voice is included in assisting the user in hearing.

Further, by acquiring a sound source output from an image that the user currently watches in generating an assistant sound, it is possible to assist the user in hearing by a high-quality sound, and thus, it is possible to enhance a hearing aid effect.

Further, by storing a hearing above frequency of each user, it is possible to provide a customized hearing aid function, and thus, the hearing aid function may be provided regardless of frequency band of hearing impairment that the user suffers from.

Further, by adjusting movement of the robot and an output direction of the speaker, it is possible to easily provide the hearing aid function even when the robot is far from the user and to transmit an assistant sound more accurately to the user, thereby improving the hearing aid effect.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings.

MODE FOR INVENTION

Hereinafter, embodiments of the present disclosure will be described in detail with reference to the accompanying drawings, and the same or similar components will be given the same reference numerals regardless of reference numerals, and redundant description thereof will be omitted. The suffixes "module" and "unit" for components used in the description below are assigned or mixed in consideration of easiness in writing the specification and do not have distinctive meanings or roles by themselves.

It will be understood that, although the terms first, second, etc. may be used herein to describe various elements of the present invention, these terms are only used to distinguish one element from another element and essential, order, or sequence of corresponding elements are not limited by these terms.

A singular representation may include a plural representation unless context clearly indicates otherwise. It will be understood that the terms "comprise", "include", etc., when used in this specification, specify the presence of several components or several steps and part of the components or steps may not be included or additional components or steps may further be included.

Figure 1:
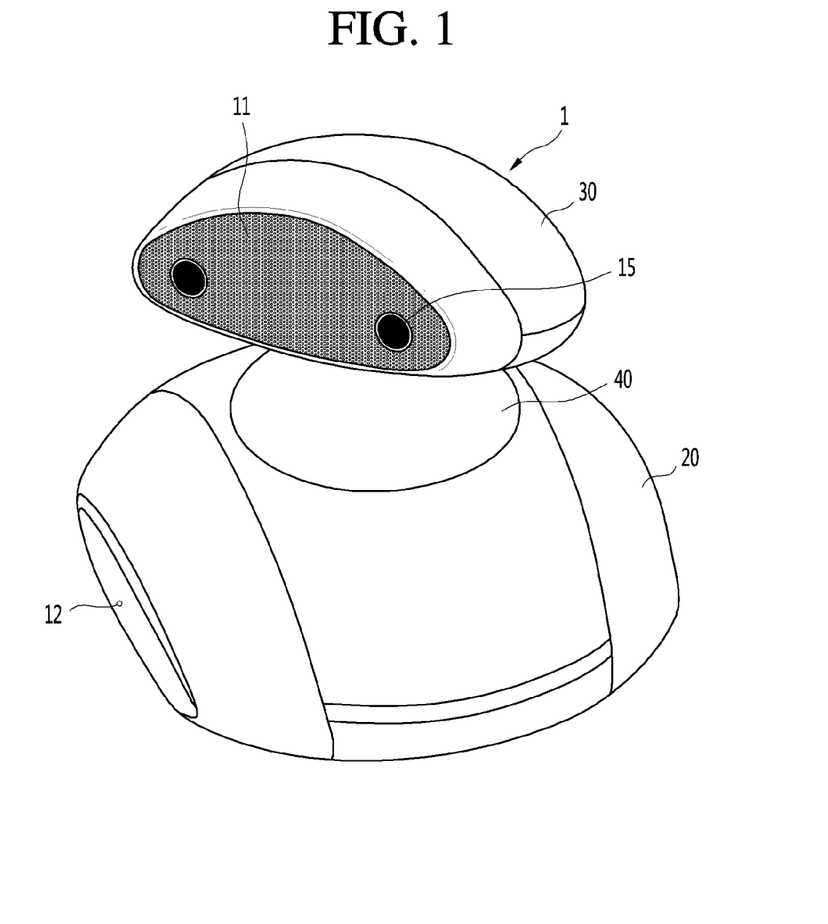
FIGS. 1 and 2 are perspective views of a robot according to an embodiment of the present invention.
Figure 2:
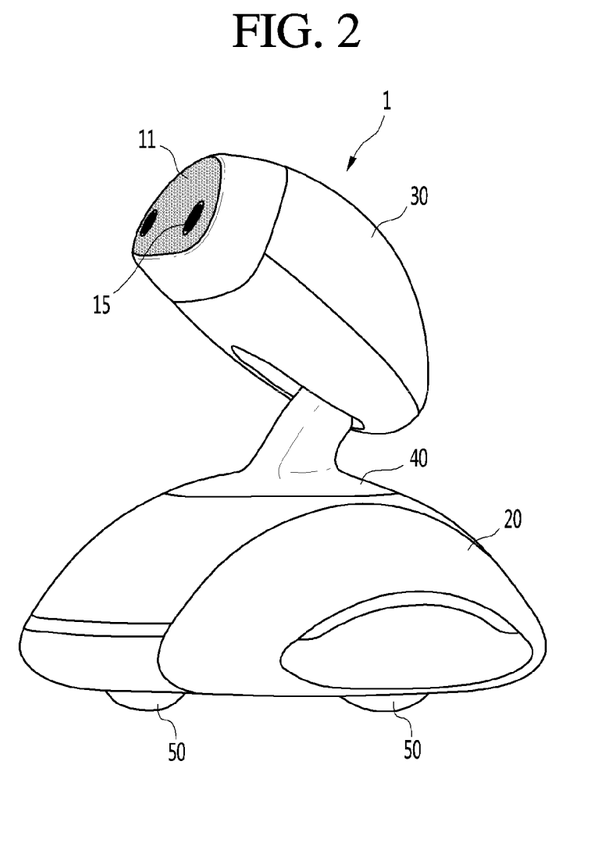
Figure 3:
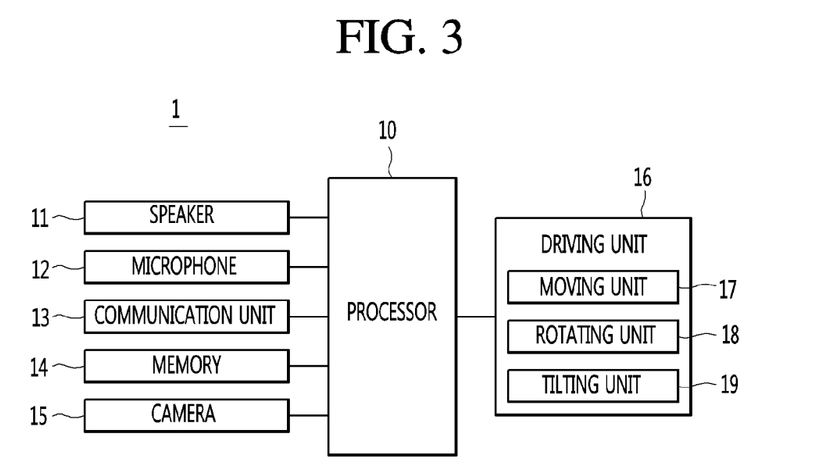
FIG. 3 is a control block diagram of a robot according to an embodiment of the present invention.
Figure 4:
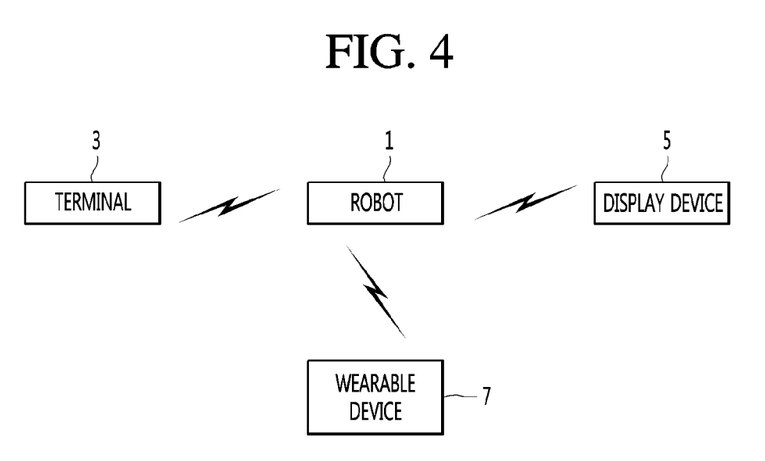
FIG. 4 is a block diagram illustrating a robot communicating with an external device according to an embodiment of the present invention.

FIGS. 1 and 2 are perspective views of a robot according to an embodiment of the present invention. FIG. 3 is a control block diagram of a robot according to an embodiment of the present invention, and FIG. 4 illustrates a state where a robot according to an embodiment of the present invention communicates with an external device.

A robot 1 may be a moving speaker robot having a speaker 11 for assisting a user in hearing.

As shown in FIGS. 1 and 2, the robot 1 may include a tilting body 30 in which the speaker 11 is mounted, a rotary body 40 connected to the tilting body 30, a main body 20 supporting the rotary body 40, and a moving body 50 which is mounted on the main body 20 and movable.

The tilting body 30 may be connected to an upper portion of the rotary body 40 and may tilt on the basis of the rotary body 40 as an axis thereof. The tilting body 30 may be tilted along a direction of the arrow shown in FIG. 2. An output direction of the speaker 11 may vary according to a tilt of the tilting body 30.

Meanwhile, the camera 15 may be further mounted on the tilting body 30. Similarly, a photographing direction of the camera 15 may vary according to a tilt of the tilting body 30.

The output direction of the speaker 11 and the photographing direction of the camera 15 may be the same. However, this is only an example and is not limited thereto.

The rotary body 40 is supported by the main body 20, the tilting body 30 may be mounted on the top of the rotary body 40.

The rotary body 40, in a state of being fixed to the main body 20, may rotate in a clockwise or counterclockwise direction. The tilting body 30 may rotate together according to the rotation of the rotary body 40.

The main body 20 may support the rotary body 40 and the tilting body 30.

A microphone 12 may be installed in the main body 20. For example, the microphone 12 may be installed on an outer surface of the main body 20. However, this is merely an example and the microphone 12 may be installed inside the main body 20.

Further, a processor 10, a communication unit 13, a memory 14, and a driving unit 16, which will be described later, may be installed inside the main body 20, but this is merely exemplary. That is, the processor 10, the speaker 11, the microphone 12, the communication unit 13, the memory 14, the camera 15, and the driving unit 16 may be located on one of the tilting body 30, the rotary body 40, and the main body.

Further, the moving body 50 may be mounted on the main body 20. For example, the moving body 50 may be mounted on a lower portion of the main body 20, and the main body 20 may move according to driving of the moving body 50.

The moving body 50, which moves a position of the robot 1, may include at least one wheel.

Referring to FIG. 3, the robot 1 may include at least one of a processor 10, a speaker 11, a microphone 12, a communication unit 13, a memory 14, a camera 15, and a driving unit 16.

The processor 10 may control an operation of the robot 1. The processor 10 may control at least one of the speaker 11, the microphone 12, the communication unit 13, the memory 14, the camera 15, and the driving unit 16.

The speaker 11 may output sound. In particular, the speaker 11 may output an assistant sound for assisting the user in hearing.

The assistant sound, which is a sound generated by the robot 1 to assist the user in hearing, may be a sound acquired by amplifying a volume of a specific frequency band of the sound or converting a specific frequency band of the sound into another frequency band. A method of generating the assistant sound by the robot 1 will be described later with reference to FIG. 5.

Meanwhile, the speaker 11 may be a directional speaker. The directional speaker is a speaker that emits sound only in a desired direction, and two or more equal aperture speakers may be arranged on the same plane to operate as one speaker on the whole.

The robot 1 may deliver the assistant sound only to a specific user through the directional speaker and minimize the assistant sound from being heard by other users.

The microphone 12 is a device that converts sound energy, which is sound vibration, into electrical energy and may receive sound waves.

The microphone 12 may recognize a voice. The processor 10 may determine whether to a hearing correction command is received on the basis of the voice recognized by the microphone 12. In addition, the processor 10 may generate an assistant sound on the basis of the voice recognized by the microphone 12.

The communication unit 13 may transmit and receive a signal between the robot 1 and an external device. For example, the external device may include a terminal 3, a display device 5, a wearable device 7, and the like, but these are merely examples and the external device is not limited thereto.

The terminal 3 refers to a device capable of receiving input information and displaying the information and may include, for example, a smartphone, a personal computer, a laptop computer, a touchpad, and the like.

The display device 5 refers to a device displaying an image, and may include, for example, a television, a monitor, and the like.

The wearable device 7 refers to an electronic device that is attached to or worn on a body, and may include, for example, a smart watch, a band, and the like.

Meanwhile, the examples of the terminal 3, the display device 5, and the wearable device 7 are provided for convenience of description and the present disclosure is not limited thereto. That is, the smart watch may correspond to the terminal 3, and the smartphone, the PC, and the like may correspond to the display device 5.

The memory 14 may store information necessary for the operation of the robot 1. In particular, the memory 14 may store hearing characteristic information for each user. Specifically, the memory 14 may store data in which hearing abnormal frequency bands at which hearing aid is required for each user are mapped. In addition, the memory 14 may store data in which hearing abnormal frequency bands requiring hearing aid and volumes required at the corresponding hearing abnormal frequency bands for each user are mapped.

The hearing abnormal frequency band may refer to a frequency band at which the user cannot hear easily, and the required volume may refer to a sound pressure level required for the user to hear a sound of a specific frequency band.

The camera 15 may capture an image. The camera 15 may capture the user's face. The processor 10 may recognize the user's face included in the image captured by the camera 15.

The processor 10 may identify a user corresponding to a hearing aid command among at least one person recognized through the camera 15.

The user corresponding to the hearing aid command may refer to a user who has requested a hearing aid function from the robot 1. The user may request the hearing aid function from the robot 1 by speaking a predetermined word or selecting a hearing aid icon (not shown) displayed on the terminal 3.

The processor 10 may acquire a hearing aid command by recognizing a predetermined word through the microphone 12 or by receiving a hearing aid request signal from the terminal 3, and when the hearing aid command is acquired, the processor 10 may acquire a user corresponding to the hearing aid command. The processor 10 may identify a user corresponding to the hearing aid command by using at least one of a user's voice and a user's face, which will be described in detail later with reference to FIG. 5.

The driving unit 16 may include at least one of a moving unit 17, a rotating unit 18, and a tilting unit 19.

The moving unit 17 may serve to move a position of the robot 1 and include the moving body 50 and a motor (not shown) for driving the moving body 50. The moving unit 17 may drive the moving body 50 to move the robot 1 to a destination. For example, the moving unit 17 may move in a direction toward the user to output only an assistant sound to the user.

The rotating unit 18 may serve to move the speaker 11 in a horizontal direction and adjust an output direction of the speaker 11. The rotating unit 18 may include the rotary body 40 and a motor (not shown) for driving the rotary body 40 and adjust a direction of the user to the output direction of the speaker 11.

The tilting unit 19 may serve to move the speaker 11 in a vertical direction and adjust an output angle of the speaker 11. The tilting unit 19 may include the tilting body 30 and a motor (not shown) for driving the tilting body 30 and adjust an output angle of the speaker 11 such that the output direction of the speaker 11 is oriented to the user.

The processor 10 may control the driving unit 16 to control a motion of the robot 1 such that the speaker 11 outputs an assistant sound only to the user corresponding to the hearing aid command.

Figure 5:
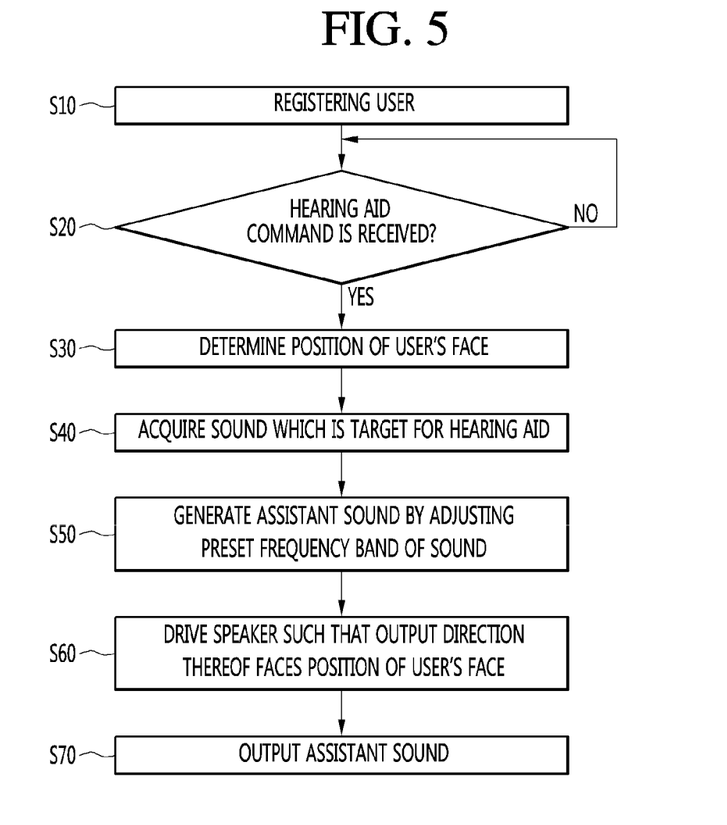
FIG. 5 is a flowchart illustrating a method of operating a robot according to an embodiment of the present invention.
Figure 6:
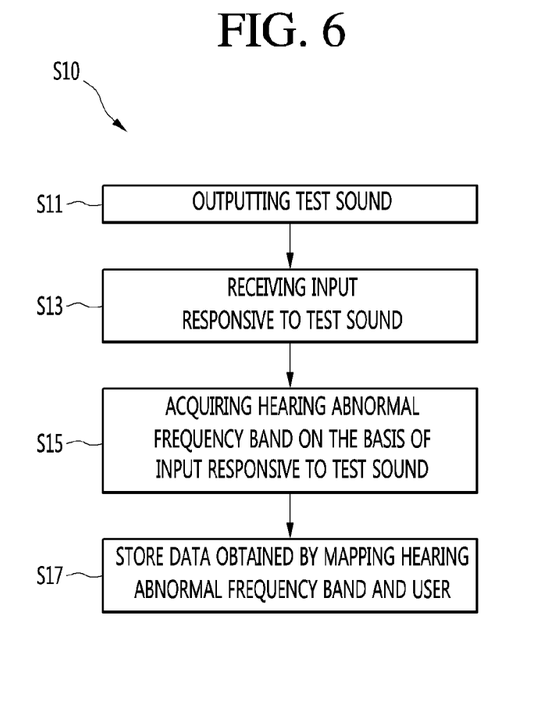
FIG. 6 is a flowchart illustrating an operation (S10) of registering a user illustrated in FIG. 5.

FIG. 5 is a flowchart illustrating a method of operating a robot according to an embodiment of the present invention, and FIG. 6 is a flowchart illustrating a step (S10) of registering a user illustrated in FIG. 5.

First, referring to FIG. 5, the processor 10 may register a user (S10).

According to an embodiment of the present disclosure, the processor 10 may previously register the user in order to provide a customized hearing aid function according to hearing characteristics of the user.

Specifically, the processor 10 may acquire identification information of the user and hearing characteristic information of the user and storing data in which the identification information of the user and the hearing characteristic information of the user are mapped in the memory 14, thereby registering the user.

The identification information of the user may refer to data for distinguishing the user from other users and may include voice data of the user, face data of the user, a serial number of the terminal 3, and the like.

The processor 10 may acquire voice data of the user through the microphone 12 and acquire face data of the user through the camera 15. The processor 10 may acquire at least one of the voice data and the face data when registering the user.

The hearing characteristic information of the user may refer to hearing impairment information of each user and may include a hearing abnormal frequency band and a volume required for hearing a sound of a specific frequency band.

The processor 10 may acquire hearing characteristic information of the user through a hearing test.

Referring to FIG. 6, the processor 10 may output a test sound (S11).

The processor 10 may output a test sound by using the speaker 11. The test sound may be a sample sound for acquiring hearing characteristic information of the user.

For example, the test sound may be sounds of frequency bands which are sequentially reproduced after an audio frequency band is divided into the plurality of bands, and in this case, the processor 10 may divide the audio frequency band into a plurality of partial frequency bands and sequentially output the frequency bands to output the test sound.

For example, the test sound may be a sound of a first partial frequency band of 5k [Hz] to 6k [Hz], a sound of a second partial frequency band of 6k [Hz] to 7k [Hz], a sound of a third partial frequency band of 7k [Hz] to 8k [Hz], a sound of a fourth partial frequency band of 8k [Hz] to 9k [Hz], a sound of a fifth partial frequency band of 9k [Hz] to 10k [Hz], a sound of a sixth partial frequency band of 10k [Hz] to 11k [Hz], a sound of a seventh partial frequency band of 11k [Hz] to 12k [Hz], and a sound of an eighth partial frequency band of 12k [Hz] to 13k [Hz] which are sequentially reproduced.

However, the test sound is merely an example for explanation, and the test sound may include all sounds by which the hearing characteristic information of the user is recognized.

The processor 10 may receive an input in response to the test sound (S13).

The processor 10 may receive an input in response to the test sound through the robot 1 or the terminal 3. Specifically, the user may input whether a sound is heard to the robot 1 or the terminal 3, while the test sound is being output, and the processor 10 may receive an input regarding whether a sound is heard through the robot 1 or the terminal 3.

For example, the processor 10 may receive an input indicating that the sounds of the first to sixth partial frequency bands are heard and may not receive an input indicating that the sounds of the seventh and eighth partial frequency bands are heard. Or, the processor 10 may receive an affirmative input indicating that the sounds of the first to sixth partial frequency bands are heard and may receive a negative input indicating that the sounds of the seventh and eighth partial frequency bands are not heard.

The processor 10 may acquire a hearing abnormal frequency band on the basis of the input responsive to the test sound (S15).

The processor 10 may acquire a hearing abnormal frequency band of each user on the basis of the input responsive to the test sound received while the test sound is output.

For example, if the processor 10 receives the input indicating that the sounds of the first to sixth partial frequency bands are heard and does not receive the input indicating that the sounds of the seventh and eighth partial frequency bands are heard, the processor 10 may acquire the seventh and eighth partial frequency bands in which the input is not received, as hearing abnormal frequency bands. The non-received partial seventh to eighth partial frequency bands may be acquired as a hearing abnormal frequency band. Here, the processor 10 may recognize the first to sixth partial frequency bands as hearing normal frequency bands.

Meanwhile, the processor 10 may further acquire a required volume when acquiring the hearing abnormal frequency band.

The required volume may refer to a level of a minimum volume required for the user to hear sound of the hearing abnormal frequency band.

The processor 10 may output the sounds of the partial frequency bands a plurality of times, while adjusting a volume level when outputting the sound of each of the partial frequency bands. For example, the processor 10 may output the sounds of the first to eighth partial frequency bands at volume levels of 40 dB, 60 dB, 80 dB, 100 dB, and 120 dB, respectively. The processor 10 may receive an input indicating that the sound of the seventh partial frequency band is heard when it is output at 60 dB, and may not receive an input indicating that the sound of the seventh partial frequency band is not heard when it is output at 40 dB. In this case, the processor 10 may acquire the required volume of the seventh partial frequency band as 60 dB.

In this way, the processor 10 may acquire a hearing abnormal frequency band and a required volume of each frequency band through an input responsive to the test sound.

The processor 10 may store data in which hearing abnormal frequency bands and users are mapped (S17).

When the required volumes are acquired together with the hearing abnormal frequency bands, the processor 10 may store data in which the hearing abnormal frequency bands, the necessary volumes, and users are mapped.

Data in which hearing abnormal frequency bands are mapped to each user according to an embodiment of the present invention will be described with reference to FIGS. 7 and 8.

Figure 7:
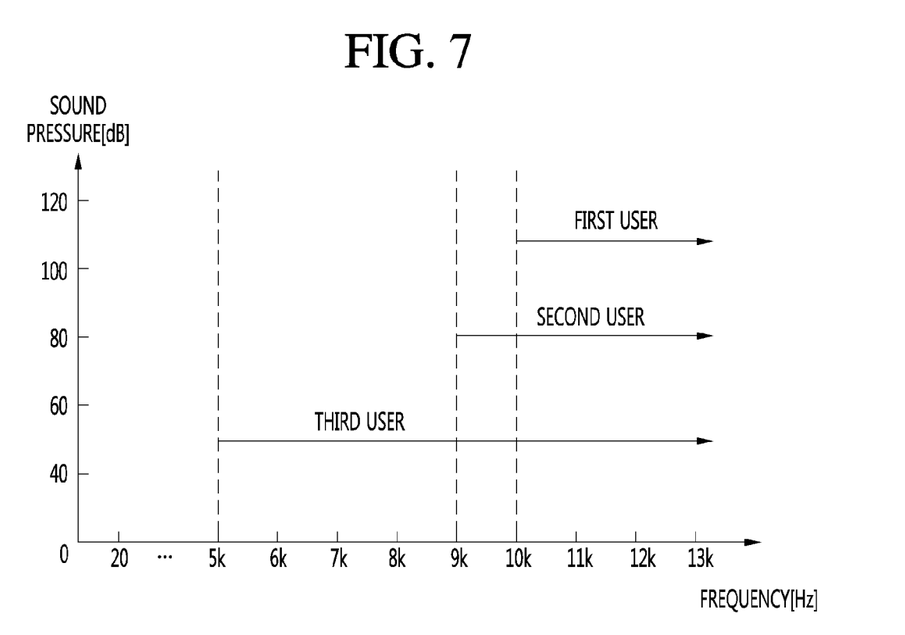
FIG. 7 is view illustrating data in which users and hearing abnormal frequency bands are mapped according to an embodiment of the present invention.
Figure 8:
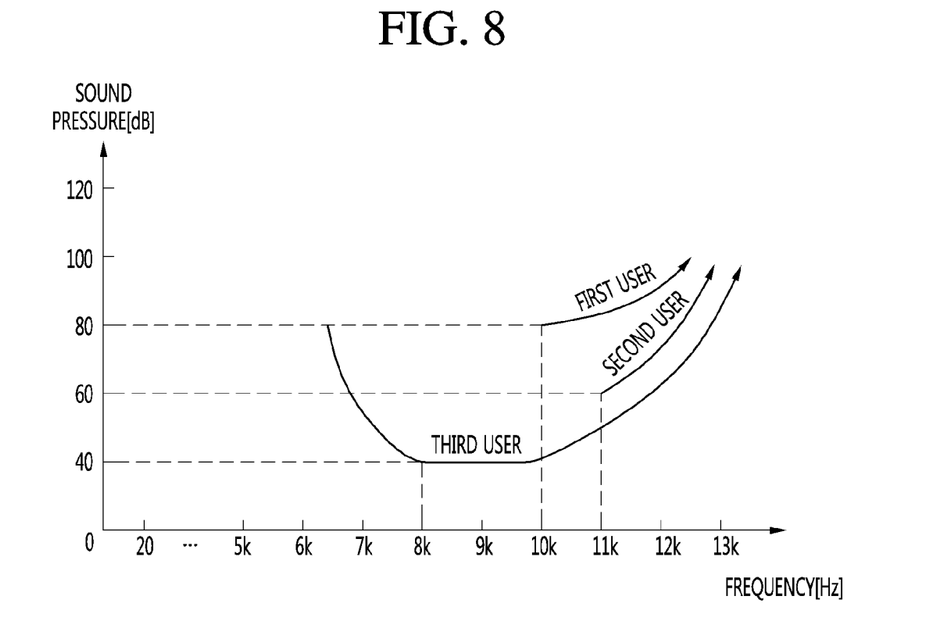
FIG. 8 is a view illustrating data in which users, hearing abnormal frequency bands, and required volumes are mapped according to an embodiment of the present invention.

FIG. 7 is a view illustrating data obtained by mapping users and hearing abnormal frequency bands according to an embodiment of the present invention, and FIG. 8 is a view illustrating data obtained by mapping users, hearing abnormal frequency bands, and required volumes according to an embodiment of the present invention.

As shown in FIG. 7, the memory 14 may store data obtained by mapping a first user and a frequency band of 10k [Hz] or higher as a hearing abnormal frequency band of the first user, data obtained by mapping a second user and a frequency band of 9k [Hz] or higher as a hearing abnormal frequency band of the second user, and data obtained by mapping a third user and a frequency band of 5k [Hz] or higher as a hearing abnormal frequency band of the third user.

Alternatively, as shown in FIG. 8, the memory 14 may store data obtained by mapping a first user, a frequency band of 10k [Hz] or higher as a hearing abnormal frequency band of the first user, and a required volume at each frequency band corresponding to the hearing abnormal frequency band (a sound pressure indicated in the graph of the first user. e.g., a required volume at 10k [Hz] is 80 dB), data obtained by mapping a second user, a frequency band of 11k [Hz] or higher as a hearing abnormal frequency band of the second user, and a required volume at each frequency band corresponding to the hearing abnormal frequency band (a sound pressure indicated in the graph of the second user, e.g., a required volume at 11k [Hz] is 60 dB), and data obtained by mapping a third user, a frequency band of 6.5k [Hz] or higher as a hearing abnormal frequency band of the third user, and a required volume at each frequency band corresponding to the hearing abnormal frequency band (a sound pressure indicated in the graph of the third user, e.g., a required volume at 15k [Hz] is 40 dB).

However, FIGS. 7 and 8 are merely examples for convenience of description, and thus, the present invention is not limited thereto.

FIG. 5 will be described again.

The processor 10 may acquire whether a hearing aid command is received (S20).

According to an embodiment of the present disclosure, the user may request hearing aid from the robot 10 through a voice. For example, the user may request hearing aid from the robot 10 by saying a predetermined word such as "Hearing aid execution" or the like. However, the "Hearing aid execution" is merely an example for convenience of explanation, and words for requesting the hearing aid may be different for each robot 1 or for each user. For example, a word that the first user requests hearing aid from the robot 1 may be "Hearing aid execution", a word that the second user requests hearing aid from the robot 1 may be "Help me", and a word that the third user requests hearing aid from the robot 1 may be "Hi, robot".

When a preset word is detected in a voice recognized by the microphone 12, the processor 10 may determine that a hearing aid command is received.

According to another embodiment, the user may request a hearing aid through the terminal 3. For example, the user may request a hearing aid function from the robot 1 by selecting a hearing aid icon (not shown) displayed on the terminal 3. When a hearing aid request is received from the terminal 3, the processor 10 may determine that the hearing aid command is received.

That is, the processor 10 may acquire the hearing aid command through at least one of the microphone 12 and the communication unit 13, but it is appropriate that the hearing aid command is not limited to the above example and the processor 10 may determine whether the hearing aid command is received in various ways.

The processor 10 may check a position of the user's face when the hearing aid command is acquired (S30).

When the hearing aid command is acquired, the processor 10 may identify a user corresponding to the hearing aid command on the basis of the data stored in the memory 14, and acquires the user corresponding to the hearing aid command and a position of the user's face using at least one of the microphone 12 and the camera 15.

For example, the processor 10 may acquire a direction in which the user's voice is received through the microphone 12 as the position of the user's face and acquire the position of the user's face through an image captured by the camera 15.

Meanwhile, there may be several people in a space where the robot 1 is located, and in this case, the processor 10 may acquire a position of the user's face corresponding to the hearing aid command. Specifically, the processor 10 may recognize the user who requests the hearing aid. For example, the processor 10 may recognize voice information of a user who requests hearing aid through the microphone 12, recognizes the face of the user who requests hearing aid through the camera 15, or acquires a serial number of the terminal 3 which has transmitted a hearing aid request signal. The processor 10 may identify the user matched to voice information of the user, face information of the user, or the serial number of the terminal 3 and acquire a position of the face of the identified user.

The processor 10 may acquire a sound which is a target for hearing aid (S40).

The processor 10 may acquire a sound which is a target for hearing aid of the user after acquiring the position of the user's face. Here, the sound which is the target for hearing aid is a sound requiring hearing aid for the user corresponding to the hearing aid command and is a sound currently being heard by the user corresponding to the hearing aid command.

According to a first embodiment, the processor 10 may acquire a sound which is a target for hearing aid through the microphone 12.

For example, the microphone 12 may recognize an ambient sound to acquire a sound which is a target for hearing aid, and the processor 10 may acquire the ambient sound as a sound which is a target for hearing aid through the microphone 12.

As another example, the processor 10 may acquire the ambient sound, except for the user's voice, among the ambient sounds recognized through the microphone 12 as a sound which is a target for hearing aid. The processor 10 may acquire voice data of the user corresponding to the hearing aid command through identification information of the user and exclude only the voice of the user corresponding to the hearing aid command from the ambient sounds recognized through the microphone 12. Through this, only the ambient sound excluding the voice of the user may be provided to the user, and thus, only the sound requiring hearing aid for the user may be effectively provided.

According to a second embodiment, the processor 10 may receive a sound source being output by the display device 5 from the display device 5 and acquire the received sound source as a sound which is a target for hearing aid.

Specifically, the processor 10 may receive a sound source currently being output by the display device 5 from the display device 5 through the communication unit 13. For example, the communication unit 13 may receive the sound source being currently output by the display device through wireless communication such as Wi-Fi, Bluetooth, etc., but the communication technology is merely an example and the present invention is not limited thereto. In this case, the sound output from an image currently viewed by the user may be acquired with better sound quality, and thus, the sound required by the user may be effectively provided.

The processor 10 may generate an assistant sound by adjusting a preset frequency band of a sound (S50).

The processor 10 may generate an assistant sound by amplifying a volume of a preset frequency band of a sound acquired as a target for hearing aid or converting the preset frequency band of the sound acquired as the target for hearing aid to another frequency band.

Here, the preset frequency band may refer to a hearing abnormal frequency band set for each user. The processor 10 may set the hearing abnormal frequency band to a frequency band which is amplified or converted when generating the assistant sound.

That is, in a case where the hearing abnormal frequency band of the first user is a frequency band of 10k [Hz] or higher, the processor 10 may acquire a sound of a frequency band of 10k [Hz] or higher from a target sound for hearing aid and amplify a volume of the sound of a frequency band of 10k [Hz] or higher or converting the frequency band of 10k [Hz] or higher into another frequency band, thereby generating an assistant sound.

According to an embodiment of the present disclosure, the processor 10 may generate the assistant sound by amplifying a volume of a preset frequency band by a predetermined size (for example, 40 dB) in the sound which is the target for hearing aid.

Meanwhile, in a case where the memory 14 stores a required volume, the processor 10 may acquire an amplification amount according to the required volume. For example, in a case where a sound pressure of the preset frequency band of the sound is 40 dB and the required volume is 80 dB, the processor 10 may acquire 40 dB obtained by subtracting the preset frequency band from the required volume as an amplification amount. The processor 10 may generate an assistant sound by amplifying the preset frequency band of the sound which is the target for hearing aid by the required volume.

According to another embodiment, the processor 10 may generate an assistant sound by converting the preset frequency band of the sound which is the target for hearing aid into another frequency band. Here, the other frequency band may be a hearing normal frequency band of the user and may be another frequency band except for the hearing abnormal frequency band. For example, the processor 10 may generate an assistant sound by converting the frequency band of 10k [Hz] or higher of the sound which is the target for hearing aid into a frequency band of 5k [Hz] or higher.

That is, the processor 10 may acquire the hearing abnormal frequency band mapped to the user corresponding to the hearing aid command from the memory 14, set the hearing abnormal frequency band as a frequency band which is amplified or converted when generating the assistant sound, and adjust the set frequency band of the sound, thereby generating an assistant sound.

As such, the processor 10 may generate an assistant sound on the basis of hearing characteristics of each user.

The processor 10 may drive the driving unit 16 such that an output direction of the speaker 11 faces a position of the user's face (S60).

The processor 10 may control the driving unit 16 such that the speaker 11 faces the position of the user's face acquired in step S30.

The processor 10 may control the moving unit 17 such that the robot 1 moves to a position where the speaker 11 may output the assistant sound toward the user's face, and control at least one of the rotating unit 18 and the tilting unit 19 such that an output direction of the speaker 11 faces the user's face.

The processor 10 may output an assistant sound after controlling the driving unit 16 (S70).

According to an embodiment of the present disclosure, the processor 10 may output the assistant sound, while moving along the user corresponding to the hearing aid command.

For example, the processor 10 may generate and output the assistant sound, while following the user so as to be located within a predetermined distance from the user corresponding to the hearing aid command, while continuously recognizing the user's face.

As another example, the user may wear the wearable device 7 interworking with the robot 1, and the processor 10 may output an assistant sound, while moving along the user who wears the wearable device 7 while recognizing a position of the wearable device 7.

Figure 9:
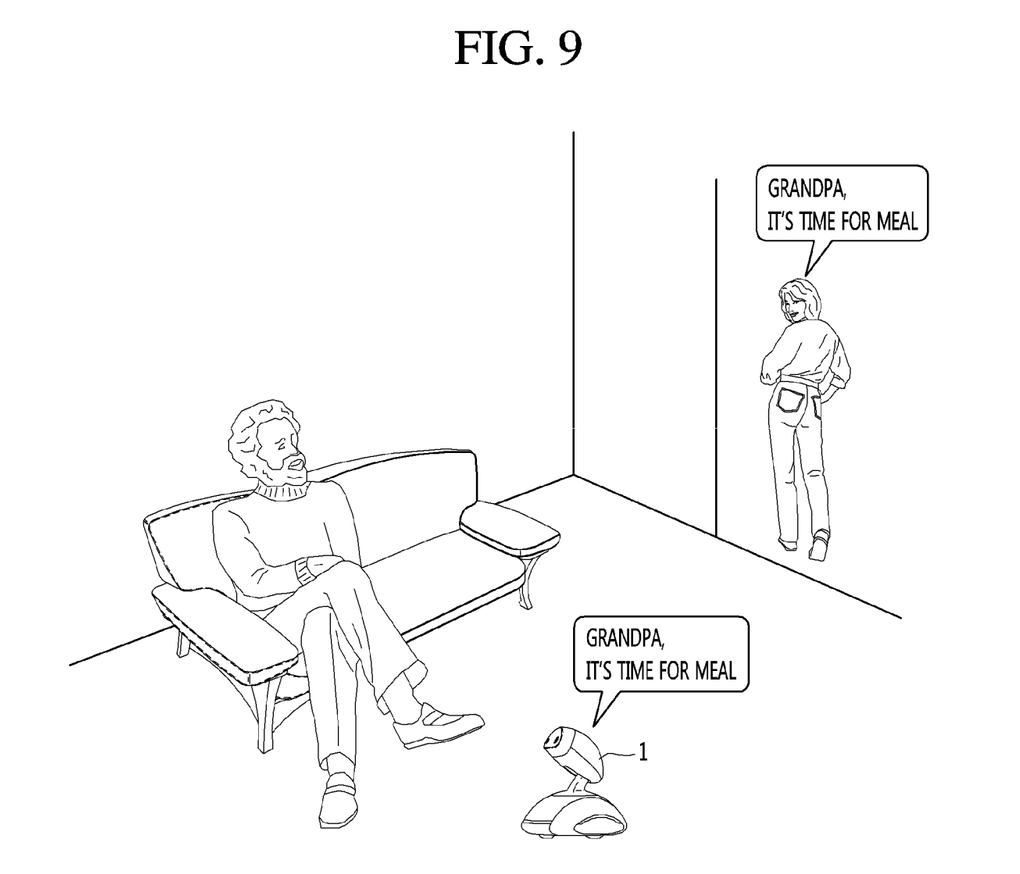
FIG. 9 is a view illustrating a state where a robot outputs an assistant sound according to an embodiment of the present invention.
Figure 10:
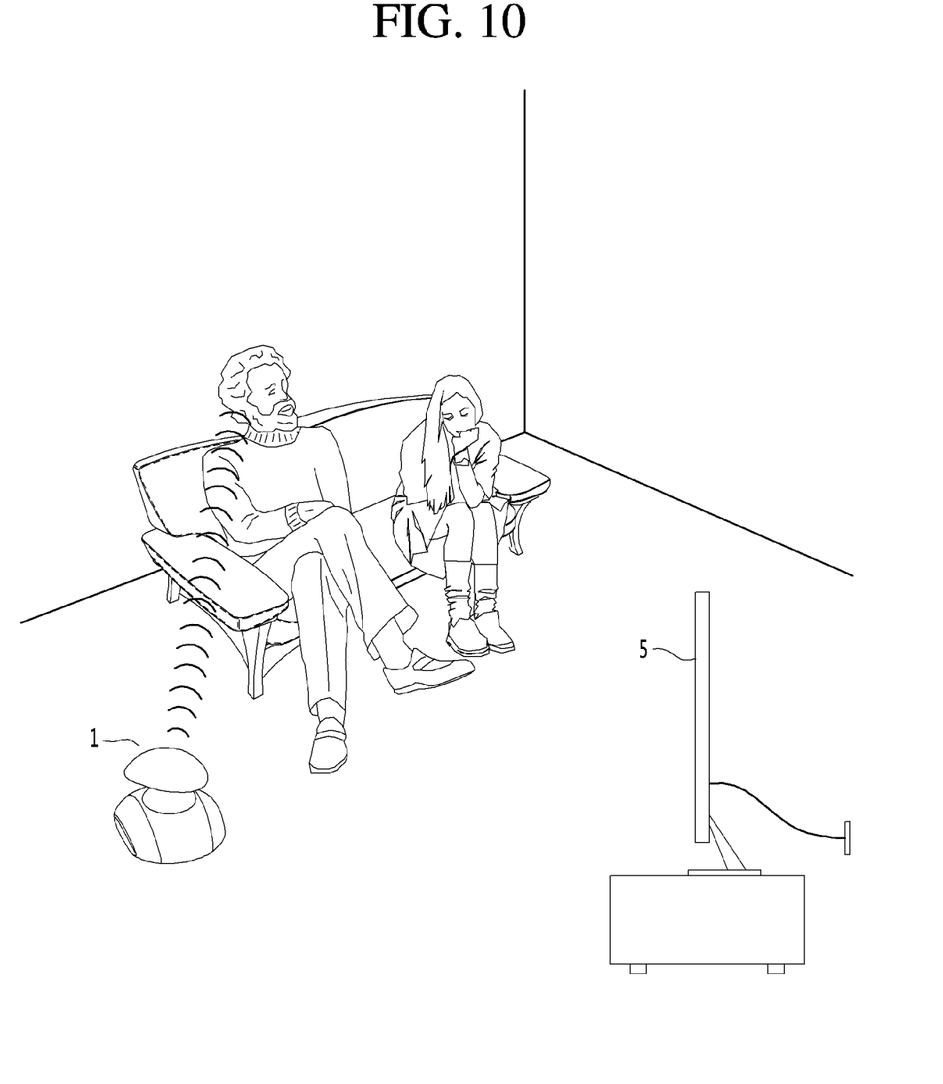
FIG. 10 is a view illustrating a state where a robot outputs an assistant sound according to another embodiment of the present invention.

FIG. 9 is a view showing a state where a robot outputs an assistant sound according to an embodiment of the present invention, and FIG. 10 is a view showing a state where a robot outputs an assistant sound according to another embodiment of the present invention.

Referring to FIG. 9, when a hearing aid command is acquired, the processor 10 may recognize another person's voice (for example, "Grandpa, it's time for meal") through the microphone 12, amplify a sound of a preset frequency band of the recognized voice or convert the preset frequency band into another frequency to generate an assistant sound, and output the generated assistant sound to a position of the user's face. The amplified sound may be amplified or converted to another frequency to generate an assistant sound and output it to the user's face position.

Referring to FIG. 10, when the hearing aid command is received, the processor 10 may receive a sound source from the display device 5, amplify a sound of a frequency band of the sound source or convert the frequency band into another frequency to generate an assistant sound, and output the generated assistant sound to the position of the user's face. In particular, even if there are several people, the processor 10 may recognize a user corresponding to the hearing aid command, and output the assistant sound toward a position of the user's face corresponding to the hearing aid command.

Through this, the robot 1 may deform the sound of the frequency band corresponding to the hearing abnormality of the user into a form that the user may hear well, and then delivers the sound only to the user, thereby assisting the user in hearing and minimizing an influence on the others.

Meanwhile, according to an embodiment of the present disclosure, in a case where there are a plurality of people and there are a plurality of users corresponding to the hearing aid command, the processor 10 may set priority for designating order of providing the hearing aid function. For example, the processor 10 may set priority to provide the hearing aid function, starting from a person having the lowest hearing abnormal frequency band.

The above description is merely illustrative of the technical idea of the present invention, and various modifications and changes may be made thereto by those skilled in the art without departing from the essential characteristics of the present invention.

Therefore, the embodiments of the present invention are not intended to limit the technical spirit of the present invention but to illustrate the technical idea of the present invention, and the technical spirit of the present invention is not limited by these embodiments.

The scope of protection of the present invention should be interpreted by the appending claims, and all technical ideas within the scope of equivalents should be construed as falling within the scope of the present invention.

The invention claimed is:

1. A robot for assisting a user in hearing, the robot comprising:
   a microphone configured to receive at least one of a voice command for assisting in hearing and a surrounding sound;
   a camera configured to capture an image of a face of the user;
   a memory storing mapping data including identification information of at least one user, hearing characteristic information including a specific frequency band and volume information required for the user to hear a sound of the specific frequency band based on a result of a hearing test;
   a processor configured to:
      communicate with an external device,
      identify the user corresponding to the voice command based on the stored mapping data, acquire a position of the face of the user using at least one of the microphone and the camera, determine a target sound source corresponding to the voice command, acquire a target sound excluding a voice of the user from the target sound source, via at least one of the microphone and the external device, generate an assistant sound by adjusting the specific frequency band of the target sound based on the mapping data, and control a motion of the robot;

a speaker configured to output the assistant sound toward the face of the user; and a body configured to drive the motion of the robot in a direction toward the user to output the assistant sound or to receive the voice command.

2. The robot of claim 1, wherein the external device comprises at least one of a terminal, a display device and a wearable device.

3. The robot of claim 2, wherein the terminal comprises at least one of a smartphone, a personal computer, a laptop computer and a touchpad to receive input information and display the input information.

4. The robot of claim 2, wherein the mapping data comprises a serial number of the terminal corresponding to the identification information.

5. The robot of claim 1, wherein the processor is further configured to:

acquire a hearing aid command from the external device, and identify the user corresponding to the hearing aid command based on the stored mapping data.

6. The robot of claim 1, wherein the memory stores a preset word corresponding to the voice command to be detected in a voice recognized by the microphone.

7. The robot of claim 1, wherein the processor is further configured to:

output a test sound for the hearing test, determine the specific frequency band based on not receiving user input from the user, acquire the volume information corresponding to the specific frequency band for the user to hear the sound of the specific frequency band, and amplify or convert the specific frequency band.

8. The robot of claim 7, wherein the test sound comprises at least one partial frequency band of an audio frequency band.

9. The robot of claim 1, wherein the body comprises at least one of a movable body, a rotary body, and a tilting body.

10. The robot of claim 9, wherein the at least one of the movable body, the rotary body and the tilting body is configured to adjust an output angle of the speaker to output the assistant sound to the user corresponding to the voice command.

11. The robot of claim 1, wherein the processor is further configured to acquire a position of the user using a direction in which the voice of the user is received through the microphone and acquire a position of the face of the user through the image captured by the camera.

12. The robot of claim 1, wherein the processor is further configured to communicate with the external device through a wireless communication.

13. The robot of claim 1, wherein the volume information comprises a required sound pressure level of the specific frequency band.

14. The robot of claim 1, wherein the processor is configured to generate the assistant sound in a designated order in a situation where there are a plurality of voice commands.

15. The robot of claim 1, wherein the processor is configured to generate the assistant sound by amplifying the specific frequency band of the target sound or converting the specific frequency band of the target sound into a different frequency band.

16. The robot of claim 1, wherein the speaker is a directional speaker for emitting sound in a desired direction.

* * * * *